United States Patent
Valdez et al.

(10) Patent No.: US 8,704,481 B2
(45) Date of Patent: Apr. 22, 2014

(54) CHOKE WITH CURRENT SENSOR

(75) Inventors: Carlos Rodriguez Valdez, Glendale, WI (US); Rangarajan Tallam, Germantown, WI (US); Russel Kerkman, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 587 days.

(21) Appl. No.: 13/014,640

(22) Filed: Jan. 26, 2011

(65) Prior Publication Data

US 2012/0187883 A1 Jul. 26, 2012

(51) Int. Cl.
*H02P 27/04* (2006.01)

(52) U.S. Cl.
USPC .......... 318/801; 318/490; 318/815; 361/91.1; 361/111; 363/34; 363/37; 363/40

(58) Field of Classification Search
USPC ................. 318/801, 490, 815; 361/91.1, 111; 363/34, 37, 40
See application file for complete search history.

(56) References Cited

U.S. PATENT DOCUMENTS

| | | | |
|---|---|---|---|
| 3,953,767 A * | 4/1976 | Ahmed | 361/44 |
| 5,646,498 A * | 7/1997 | Lipo et al. | 318/800 |
| 6,377,479 B1 * | 4/2002 | Ayano et al. | 363/40 |
| 7,113,065 B2 | 9/2006 | Skibinski | |
| 7,230,488 B2 * | 6/2007 | Tsuruya | 330/276 |
| 7,292,420 B2 * | 11/2007 | Jones | 361/42 |
| 7,564,703 B1 | 7/2009 | Braun et al. | |
| 8,433,528 B2 * | 4/2013 | Winterhalter et al. | 702/58 |
| 2009/0154034 A1 | 6/2009 | Tallam | |
| 2009/0296289 A1 | 12/2009 | Valdez et al. | |
| 2009/0303652 A1 | 12/2009 | Tallam et al. | |

* cited by examiner

*Primary Examiner* — Erick Glass
(74) *Attorney, Agent, or Firm* — Fletcher Yoder; Alexander R. Kuszewski; John M. Miller

(57) ABSTRACT

The present invention relates generally to systems and methods for detecting ground faults (i.e., line-to-ground faults) in motor drive systems. In particular, the embodiments described herein include a common mode choke of a motor drive system having additional (i.e., secondary) turns wound around a core of the common mode choke. These secondary turns are in addition to and separate from a plurality of sets of primary turns wound around the core of the common mode choke, each set of primary turns corresponding to a phase of AC power to which the common mode choke is directly coupled. The secondary turns terminate in series with a burden resistor. Ground faults may be detected by monitoring the voltage across the burden resistor. More specifically, the embodiments described herein include a controller including program instructions for receiving signals indicative of the voltage across the burden resistor, and for monitoring the voltage across the burden resistor to determine when ground faults occur in the motor drive system.

17 Claims, 4 Drawing Sheets

CHOKE WITH CURRENT SENSOR

BACKGROUND

The invention relates generally to sensing ground faults in motor drives. Particularly, this invention relates to an integrated common mode choke for sensing ground faults.

Motor drives often include converter circuitry for converting incoming AC power into DC power, and inverter circuitry for converting the DC power into controlled frequency AC power output. Output currents for three phases of the AC power may be sensed for motor control and protection. For example, a ground current may be determined by summing all three measured phase currents. When the sum of the three phase currents exceeds a threshold value (e.g., 20% of the rated current for the motor drive), a ground fault of the motor drive may be considered to have occurred. Often, firmware-based ground fault detection samples the sum of the three phase currents, filters the result, and generates an alarm when the threshold value is exceeded. The threshold value may be adjustable to low levels, but this method of ground fault detection is still somewhat sensitive to noise and feedback accuracy. Furthermore, the ground fault current may often be very low on AC power systems that are not solidly grounded (e.g., lower than 10 amperes) and, thus, the motor drive may not fault when it perhaps should. As such, the firmware-based ground fault alarm method does not reliably detect ground faults of the motor drive. Therefore, there is a need for more reliable detection of low levels of ground fault currents for motor drives.

BRIEF DESCRIPTION

The present invention relates generally to systems and methods for detecting ground faults (i.e., line-to-ground faults) in motor drive systems. In particular, the embodiments described herein include a common mode choke of a motor drive system having additional (i.e., secondary) turns wound around a core of the common mode choke. These secondary turns are in addition to and separate from a plurality of sets of primary turns wound around the core of the common mode choke, each set of primary turns corresponding to a phase of AC power to which the common mode choke is directly coupled. The secondary turns terminate in series with a burden resistor. Ground faults may be detected by monitoring the voltage across the burden resistor. More specifically, the embodiments described herein include a controller including program instructions for receiving signals indicative of the voltage across the burden resistor, and for monitoring the voltage across the burden resistor to determine when ground faults occur in the motor drive system.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
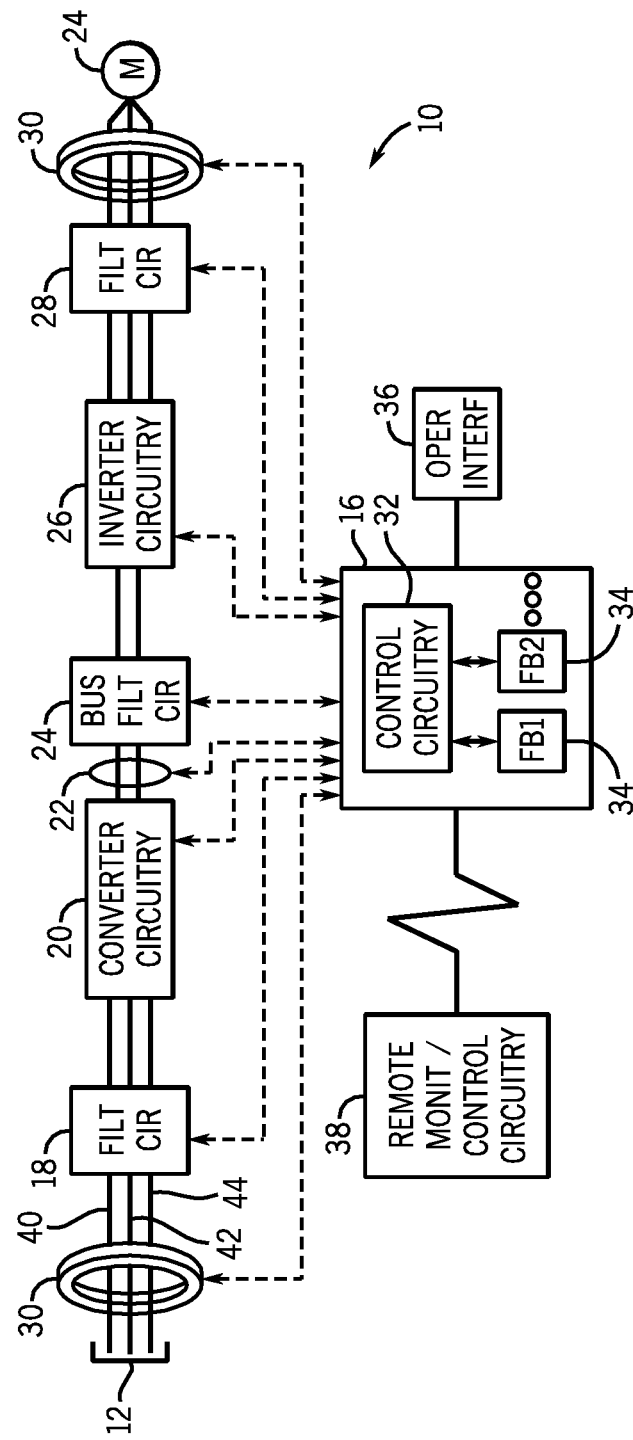
FIG. 1 is a diagrammatical representation of an exemplary embodiment of a motor drive system.

Turning now to the drawings, FIG. 1 represents a motor drive system 10 in accordance with aspects of the present disclosure. The motor drive system 10 is configured to be coupled to a source of AC power, such as the power grid, as indicated by reference numeral 12, and to deliver conditioned power to a motor 14 or any other suitable load. A controller 16 is coupled to the circuitry of the motor drive system 10 and is configured to control operation of the circuitry as described more fully below. In a presently contemplated embodiment, the controller 16 may be housed in the drive or in a separate enclosure. Appropriate cabling (e.g., fiber optic cabling) is provided to communicate control and feedback signals between the controller 16 and the circuitry of the individual drives. In the embodiment illustrated in FIG. 1, power filtration circuitry 18 may be provided upstream of the motor drive. Such circuitry may include inductors, capacitors, circuit breakers, fuses, and so forth, that are generally conventional in design and application.

The motor drive system 10 may also include converter circuitry 20 that converts the three phases of AC power from the AC power source 12 to DC power, which is applied to a DC bus 22. The converter circuitry 20 may be passive or active. That is, in a presently contemplated embodiment, non-switched circuitry alone is used to define a full wave rectifier that converts the incoming AC power to DC power that is applied to the DC bus 22. In other embodiments, the converter circuitry 20 may be active, including controlled power electronic switches that are switched between conducting and non-conducting states to control the characteristics of the DC power applied to the DC bus 22. In addition, bus filtration circuitry 24 may be provided that conditions the DC power conveyed along the DC bus 22. Such filtration circuitry may include, for example, capacitors, inductors (e.g., chokes), braking resistors, and so forth.

The motor drive system 10 also includes inverter circuitry 26. As will be appreciated by those skilled in the art, such circuitry will typically include sets of power electronic switches, such as insulated gate bipolar transistors (IGBTs) and diodes arranged to allow for converting the DC power from the DC bus 22 to controlled frequency AC output waveforms. The inverters thus create three phases of controlled frequency output, which may be applied to output filtration circuitry 28, which may include magnetic components that couple the output power between the phases.

In addition to (or as part of) the power filtration circuitry 18 and/or the output filtration circuitry 28, the motor drive system 10 may include common mode chokes 30 upstream and/or downstream of the motor drive. For example, in certain embodiments, the motor drive system 10 may include an upstream common mode choke 30 between the AC power source 12 and the power filtration circuitry 18 and/or a downstream common mode choke 30 between the output filtration circuitry 28 and the motor 14. In general, the common mode chokes 30 are used to reduce electrical noise known as common mode noise. The common mode chokes 30 also generally guard against interference with other electrical equipment, such as programmable controllers, sensors, analog circuits, and so forth. In addition, as described in greater detail below, the embodiments described herein include common mode chokes 30 that are used in part to detect ground faults of the motor drive system 10.

The common mode chokes 30 may be used for compliance with electromagnetic compatibility (EMC) standards. For example, as illustrated in FIG. 1, a common mode choke 30 may be added at the output of the motor drive system 10. In particular, the common mode choke 30 may be used in high-power motor drives. The use of common mode chokes 30 may be determined by packaging constraints, power loss, and EMC performance. A typical conducted emissions spectrum is measured from 150 kHz-30 MHz. The common mode choke 30 may be particularly useful in the range of 150 kHz-1 MHz. At greater than 1 MHz, the inductance of the core may drop appreciably (e.g., the permeability of typical materials used for the core of the common mode choke 30 drops rapidly above 1 MHz). Since common mode cores are designed to meet EMC regulations, which are typically tested at short cable lengths, the saturation current for the common mode choke 30 may be relatively low (e.g., approximately 5-10 amperes).

The controller 16 will typically include control circuitry 32 that is configured to implement various control regimes by properly signaling the inverter circuitry 26 (and, where appropriate, the converter circuitry 20) to control the power electronic switches within these circuits. The control circuitry 32 may, for example, include any suitable processor, such as a microprocessor, field programmable gate array (FPGA), memory circuitry, supporting power supplies, and so forth. In motor drive applications, the control circuitry 32 may be configured to implement various desired control regimes, such as for speed regulation, torque control, vector control, start-up regimes, and so forth. In the embodiment illustrated in FIG. 1, various functional circuit boards 34 are linked to the control circuitry 32 and may be provided for specific functions. For example, a wide range of options may be implemented by the use of such circuitry, including the control regimes mentioned above, as well as various communications options, safety options, and so forth.

The controller 16 will typically allow for connection to an operator interface 36, which may be local at the controller and/or remote from it. In a presently contemplated embodiment, for example, the operator interface 36 may be physically positioned on the controller 16 but removable for hand-held interfacing. The interface circuitry (e.g., portable computers) may also be coupled permanently or occasionally to the controller 16, such as via Internet cabling or other network protocols, including standard industrial control protocols. Finally, the controller 16 may be coupled to various remote monitoring and control circuitry 38. Such circuitry may include monitoring stations, control stations, control rooms, remote programming stations, and so forth. It should be noted that such circuitry may also include other drives, such that the operation of the motor drive system 10 may be coordinated, where desired, with that of other equipment. Such coordination is particularly useful in automation settings where a large number of operations are performed in a coordinated manner. Thus, the control circuitry 32 may form its control in coordination with logic implemented by automation controllers, separate computers, and so forth.

As discussed above, currents for all three phases 40, 42, 44 of AC power in the motor drive system 10 may be monitored at various points along the motor drive system 10 to control and protect the motor drive system 10. For example, a ground current may be determined by summing the currents for all three phases 40, 42, 44 of the motor drive system 10 at any point along the motor drive system 10. When the sum of the currents of the three phases 40, 42, 44 exceeds a threshold value (e.g., 20% of the rated current for the motor drive), a ground fault of the motor drive system 10 may be considered to have occurred. One method of ground fault detection includes firmware-based sampling and filtering of the currents of the three phases 40, 42, 44 to generate an alarm for the motor drive system 10 if a threshold value for the sum of the currents of the three phases 40, 42, 44 is exceeded. The threshold value may be adjustable to low levels, but this method of ground fault detection is still somewhat sensitive to noise and feedback accuracy. This method of ground fault protection may be applicable to solid ground motor drive systems where the ground fault currents are relatively high (e.g. greater than rated current for the motor drive). When the AC power system has relatively high resistance grounding (HRG), when the neutral of the three-phase AC power source is tied to ground through a resistor (e.g., a neutral grounding resistor), or when the AC power source is isolated from ground (e.g., floating power system), the ground fault current may be very low (e.g., lower than 10 amperes) and, thus, the motor drive system 10 may not fault when it perhaps should.

For HRG systems, another method of detecting ground faults includes sensing voltage across or current through neutral grounding resistors. However, this method of ground fault detection is system level and, as such, is not capable of identifying which drive of the system is faulted. Yet another method of ground fault protection includes sensing a neutral (i.e., virtual) to ground voltage inside the drive on the AC input line, the DC bus, or the AC output line. The virtual neutral is typically created with a network of resistors or capacitors. This method of ground fault detection not only detects ground faults at the output of the drive, but also ground faults that occur anywhere in the system; hence, this method is not discriminatory. As such, additional processing is required to determine where the ground fault is occurring. Indeed, under certain circumstances, it may not even be possible to determine where the ground fault is occurring. Yet another method of ground fault detection includes using a dedicated ground fault current sensor at the output of the drive. This sensor responds only to ground fault currents and not the operating currents of the motor drive. As such, this method requires additional hardware that is typically not used. This method can unambiguously identify which drive has an output ground fault but will not detect ground faults elsewhere in the system.

As described above, the motor drive system 10 may include a common mode choke 30 upstream of the motor drive (e.g., an upstream common mode choke 30 between the AC power source 12 and the power filtration circuitry 18) or downstream of the motor drive (e.g., a downstream common mode choke 30 between the output filtration circuitry 28 and the motor 14). Indeed, although illustrated as either being located (e.g., electrically coupled) upstream or downstream of the motor drive system 10, common mode chokes 30 may also be used at other locations along the motor drive system 10. For example, in certain embodiments, common mode chokes 30 may be directly coupled to the DC bus 22. As described above, the common mode chokes 30 generally reduce common mode noise interference, as well as guarding against interference with other electrical equipment. However, as described in greater detail below, the common mode chokes 30 may also be modified for use as ground fault detection equipment.

Figure 2A:
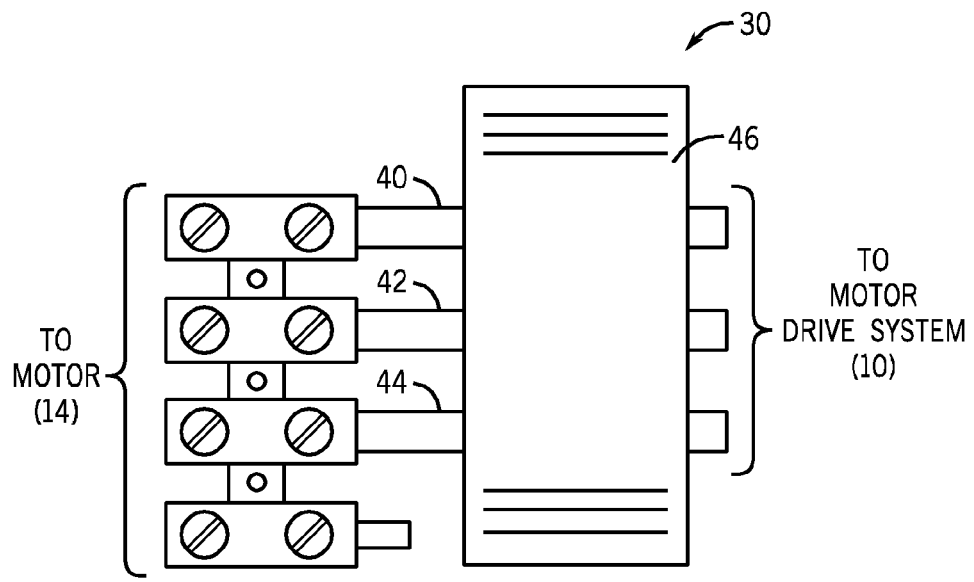
FIGS. 2A and 2B are side views of an exemplary embodiment of a common mode choke of the motor drive system of FIG. 1.
Figure 2B:
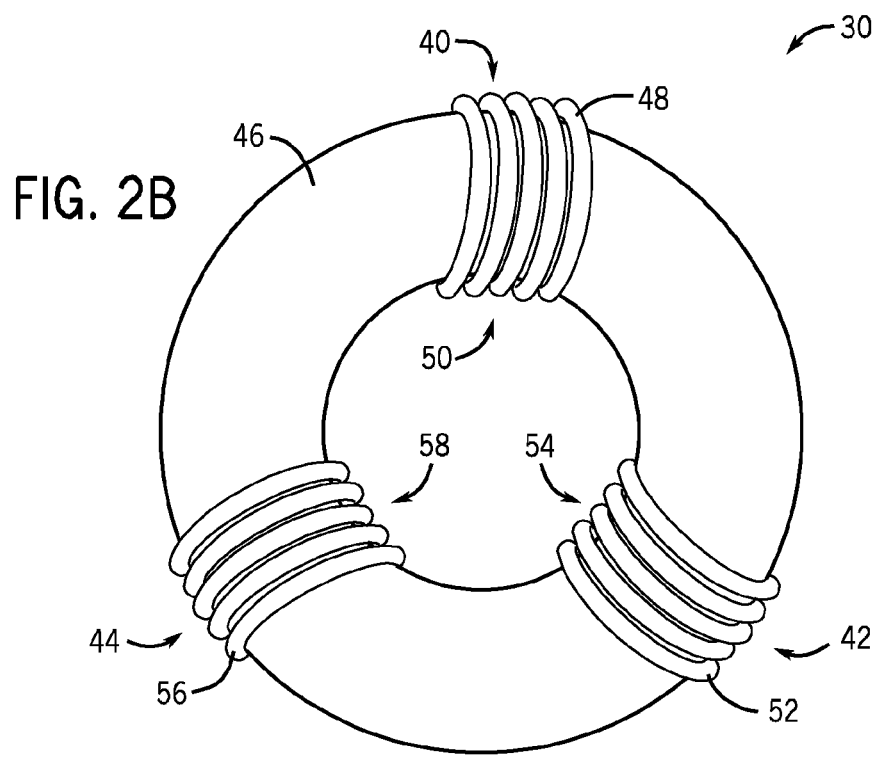

FIGS. 2A and 2B are side views of an exemplary embodiment of a common mode choke 30 of the motor drive system 10 of FIG. 1. In particular, the common mode choke 30 of FIG. 2A is a common mode choke that is connected to the motor drive system 10 at a downstream location (e.g., between the motor drive and the motor 14). However, the common mode choke 30 illustrated in FIG. 2A may be used at an upstream location (e.g., between the AC power source 12 and the motor drive system 10) or at any other location (e.g., on the DC bus 22) along the motor drive system 10.

As illustrated, the common mode choke 30 may be connected to each of the three phases 40, 42, 44 of the motor drive system 10. More specifically, each phase 40, 42, 44 of the motor drive system 10 may include a plurality of primary turns (i.e., windings) that are wrapped (i.e., wound) around a generally toroidal core 46 of the common mode choke 30. More specifically, the first phase 40 may include a first set of primary turns 48 that are wrapped around the core 46 of the common mode choke 30 near a first circumferential location 50, the second phase 42 may include a second set of primary turns 52 that are wrapped around the core 46 of the common mode choke 30 near a second circumferential location 54, and the third phase 44 may include a third set of primary turns 56 that are wrapped around the core 46 of the common mode choke 30 near a third circumferential location 58. In general, the three sets of primary turns 48, 52, 56 may be equally spaced around the circumference of the core 46 of the common mode choke 30 (i.e., spaced apart from each other at approximately 120 degree spacing along the circumference of the core 46 of the common mode choke 30). In the embodiment illustrated in FIG. 2B, each set of primary turns 48, 52, 56 includes five turns of electrical windings wrapped around the core 46 of the common mode choke 30. However, any suitable number of turns may be used in each set of primary turns 48, 52, 56. For example, in other embodiments, each set of primary turns 48, 52, 56 may include one, two, three, four, six, seven, eight, nine, ten, or even more turns. In general, the number of turns for each set of primary turns 48, 52, 56 is determined based on the amount of common mode interference reduction required for the motor drive system 10.

Figure 3:
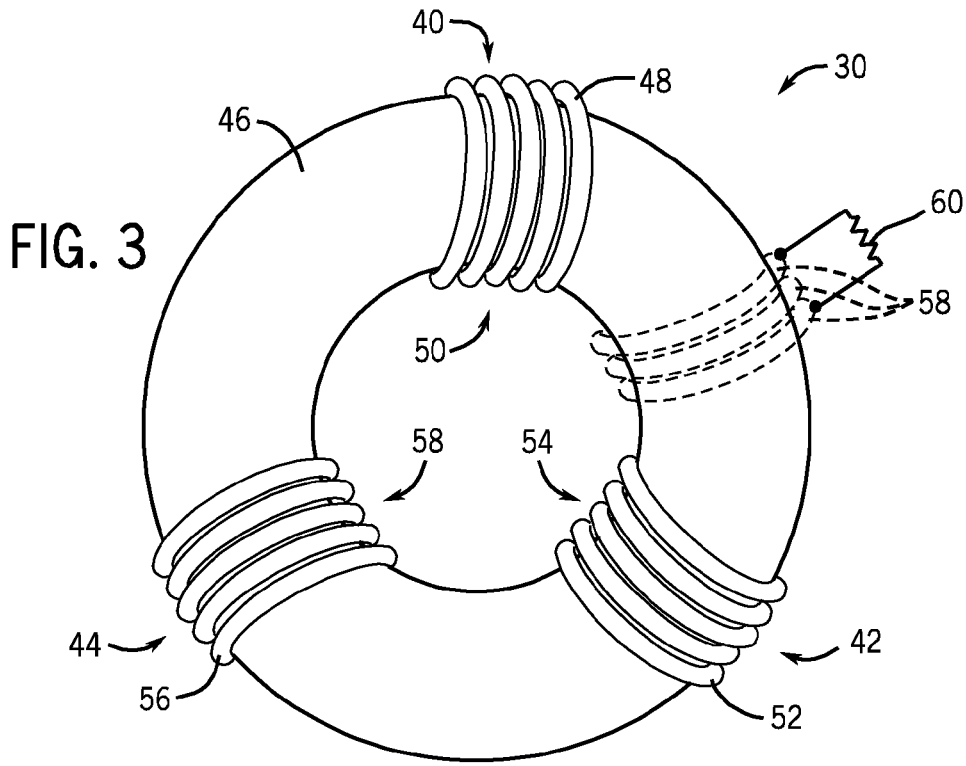
FIG. 3 is a side view of an exemplary embodiment of the common mode choke of FIGS. 2A and 2B having additional turns that terminate with a burden resistor.

As described above, the embodiments described herein are directed toward methods of detecting ground faults in the motor drive system 10 of FIG. 1 using modified versions of the common mode chokes 30 illustrated in FIGS. 2A and 2B. More specifically, the embodiments described herein include additional turns that are separate from the sets of primary turns 48, 52, 56. For example, FIG. 3 is a side view of an exemplary embodiment of the common mode choke 30 of FIGS. 2A and 2B having additional (i.e., secondary) turns 58 that terminate with a burden resistor 60. More specifically, the end turns (i.e., the beginning and end) of the secondary turns 58 will be electrically coupled to the burden resistor 60. In the embodiment illustrated in FIG. 3, the set of secondary turns 58 includes three additional (i.e., separate) turns of electrical windings wrapped around the core 46 of the common mode choke 30. However, any suitable number of turns may be used in the set of secondary turns 58. For example, in other embodiments, the set of primary turns 58 may include two, four, five, six, seven, eight, nine, ten, or even more turns. As described in greater detail below, the voltage across the burden resistor 60 is a measure of the common mode current through the core 46 (at least until the core 46 saturates).

In general, the secondary turns 58 are designed such that the insertion impedance of the secondary turns 58 and the burden resistor 60 do not appreciably affect the EMC spectrum of the motor drive system 10. In addition, the burden resistor 60 is designed such that only minimal power dissipation (e.g., both peak and average) occurs in the burden resistor 60. Furthermore, the secondary turns 58 and the burden resistor 60 are designed such that peak voltage on the secondary turns 58 is limited if the burden resistor 60 opens up.

Figure 4:
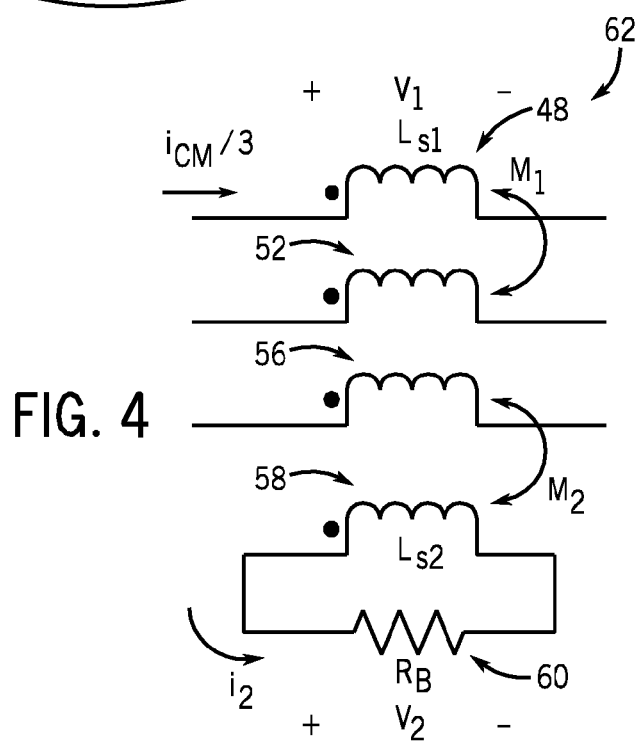
FIG. 4 is a circuit diagram of three sets of primary turns for three respective phases of AC power, the additional (secondary) turns, and the burden resistor of the common mode choke of FIG. 3 of the motor drive system.

As described above, ground faults may be detected based on the voltage across the burden resistor 60. For example, FIG. 4 is a circuit diagram 62 of the three sets of primary turns 48, 52, 56 for the three respective phases 40, 42, 44, the secondary turns 58, and the burden resistor 60 of the common mode choke 30 of FIG. 3 of the motor drive system 10. As illustrated, each of the sets of primary turns 48, 52, 56 is modeled as an inductor. More specifically, as illustrated in FIG. 4, each of the sets of primary turns 48, 52, 56 is modeled as having a self-inductance of $L_{s1}$. In addition, the secondary turns 58 are modeled as a separate inductor in series with the burden resistor 60. More specifically, as illustrated in FIG. 4, the secondary turns 58 are modeled as having a separate self-inductance of $L_{s2}$, which is in series with the burden resistor 60 having a resistance of $R_B$.

As illustrated, the four inductances (i.e., the first, second, and third inductances $L_{s1}$ associated with the sets of primary turns 48, 52, 56, and the fourth inductance $L_{s2}$ associated with the secondary turns 58) are also mutually coupled. More specifically, $M_1$ is the mutual inductance between any two of the three sets of primary turns 48, 52, 56, and $M_2$ is the mutual inductance between any one of the three sets of primary turns 48, 52, 56 and the secondary turns 58. In general, the mutual inductance $M_1$ between any two of the three sets of primary turns 48, 52, 56 is approximately equal to the self-inductance $L_{s1}$ associated with any one of the sets of primary turns 48, 52, 56. In addition, the inductance $L_{s2}$ associated with the secondary turns 58 is equal to:

$$L_{s2} = N^2 L_{s1}$$

where N is a ratio of the number of secondary turns 58 (e.g., three in the embodiment illustrated in FIG. 3) to the number of turns in each of the sets of primary turns 48, 52, 56 (e.g., five in the embodiment illustrated in FIG. 3). Furthermore, the mutual inductance $M_2$ between any one of the three sets of primary turns 48, 52, 56 and the secondary turns 58 is equal to:

$$M_2 = N L_{s1}$$

As illustrated in FIG. 4, the common mode current $i_{CM}$ of the common mode choke 30 is equally split (i.e., $i_{CM}/3$) between the three sets of primary turns 48, 52, 56 of the common mode choke 30. In addition, the voltage across the sets of primary turns 48, 52, 56 is represented as $V_1$. The voltage across and the current through the burden resistor 60 are represented as $V_2$ and $i_2$. In general, the voltage $V_1$ across the sets of primary turns 48, 52, 56 is equal to:

$$V_1 = \frac{R_B L_{s1} s}{R_B + s N^2 L_{s1}} i_{CM}$$

where s is the complex angular frequency in the Laplace transformation (i.e., in the frequency domain; in the time domain, s corresponds to the differential operator d/dt). In addition, the current $i_2$ generated through the secondary turns 58 and the burden resistor 60 is equal to:

$$i_2 = \frac{N L_{s1} s}{R_B + s N^2 L_{s1}} i_{CM}$$

The circuit diagram 62 of FIG. 4 may operate in one of two modes as explained below, depending on the particular values of $L_{s1}$, $R_B$, and N. For example, in Mode 1, the circuit diagram 62 operates as if the secondary turns 58 do not impact the operation of the common mode choke 30. Mode 1 may be used up to a certain frequency f (i.e., a cut-off frequency). In Mode 1, the referred value (i.e., $R_B/N^2$) of the burden resistor 60 is significantly higher (e.g., at least an order of magnitude higher) than the self-impedance (i.e., $\omega L_{s1}$) associated with the sets of primary turns 48, 52, 56 for a given angular frequency $\omega=2\pi f$. As such, in Mode 1, the equations for the voltage $V_1$ across the sets of primary turns 48, 52, 56 and the current $i_2$ generated through the secondary turns 58 and the burden resistor 60 simplify to:

$$V_1 = L_{s1}(si_{CM})$$

$$i_2 = \frac{NL_{s1}}{R_B}(si_{CM})$$

In addition, in Mode 1, the voltage $V_2$ across the burden resistor 60 is equal to:

$$V_2 = NL_{s1}(si_{CM})$$

In other words, in Mode 1, the voltage $V_2$ across the burden resistor 60 is proportional to the derivative of the common mode current $i_{CM}$. Hence, in Mode 1, the burden resistor 60 does not affect the inductive property of the common mode core 46. To preserve EMC performance of the common mode choke 30, the circuit parameters will be designed to ensure that Mode 1 is operative up to a certain maximum frequency f (i.e., the cut-off frequency).

In Mode 2, the circuit diagram 62 operates as if the secondary turns 58 do have a significant impact on the operation of common mode choke 30. In Mode 2, the referred value (i.e., $R_B/N^2$) of the burden resistor 60 is significantly lower (e.g., at least an order of magnitude lower) than the self-impedance (i.e., $\omega L_{s1}$) associated with the sets of primary turns 48, 52, 56 for a given angular frequency $\omega=2\pi f$. As such, in Mode 2, the equations for the voltage $V_1$ across the sets of primary turns 48, 52, 56 and the current $i_2$ generated through the secondary turns 58 and the burden resistor 60 simplify to:

$$V_1 = \frac{R_B}{N^2} i_{CM}$$

$$i_2 = \frac{i_{CM}}{N}$$

In addition, in Mode 2, the voltage $V_2$ across the burden resistor 60 is equal to:

$$V_2 = \frac{R_B}{N} i_{CM}$$

Hence, in Mode 2, the common mode core 46 has a resistive equivalent behavior. In Mode 2, the common mode core 46 operates like a current transformer, inasmuch as the current $i_2$ generated through the secondary turns 58 and the burden resistor 60 is equal to 1/N times the common mode current $i_{CM}$ of the common mode choke 30. As described above, the design of the circuit will ensure operation in Mode 1 up to the cut-off frequency f. At higher frequencies, the self-impedance (i.e., $\omega L_{s1}$) associated with the sets of primary turns 48, 52, 56 for a given angular frequency $w=2\pi f$ increases beyond the referred value (i.e., $R_B/N^2$) of the burden resistor 60, and the circuit shown in circuit diagram 62 transitions into Mode 2. This cut-off frequency f is chosen based on EMC requirements. Moreover, if the common mode core 46 without the secondary turns 58 and the burden resistor 60 being used for ground fault sensing is effective up to 2 MHz, the resistance value $R_B$ for the burden resistor 60 and the ratio N of the number of secondary turns 58 to the number of turns in each of the sets of primary turns 48, 52, 56 are selected such that Mode 1 is operable up to 2 MHz.

Figure 5:
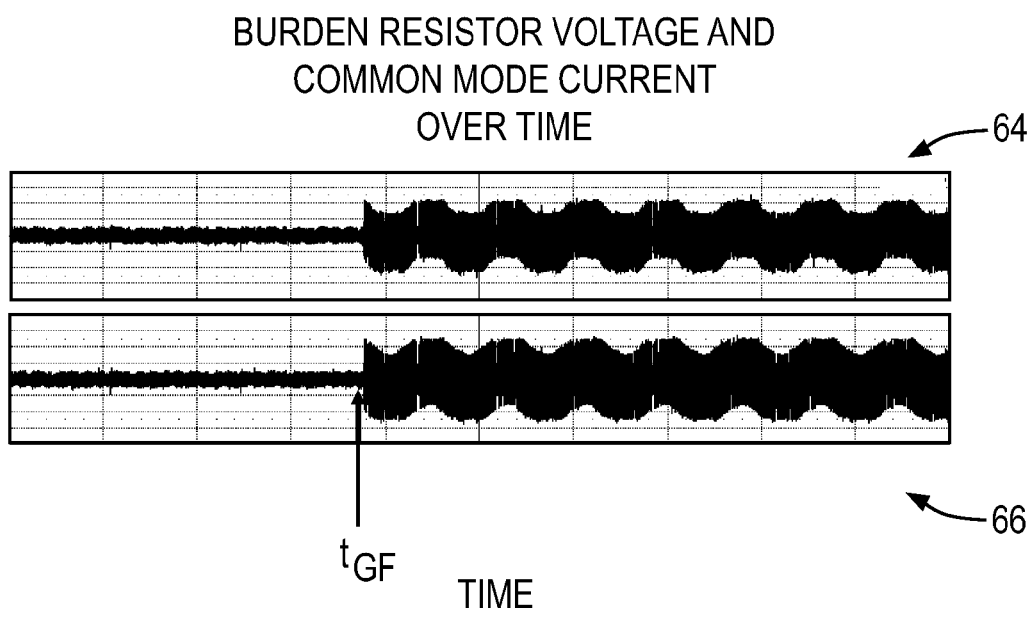
FIG. 5 is an exemplary chart of the voltage across the burden resistor over time.

As described above, the common mode choke 30 of the motor drive system 10 may be capable of determining ground faults that occur in the motor drive system 10. More specifically, the controller 16 of the motor drive system 10 may be configured to receive signals from sensors that indicative of the voltage $V_2$ across the burden resistor 60. Based on these signals, a time series of the voltage $V_2$ across the burden resistor 60 may be obtained and monitored by the controller 16. For example, FIG. 5 is an exemplary chart 64 of the voltage $V_2$ across the burden resistor 60 over time. For comparison purposes, FIG. 5 also illustrates an exemplary chart 66 of the common mode current $i_{CM}$ of the common mode choke 30. FIG. 5 depicts how the voltage $V_2$ across the burden resistor 60 strongly correlates to the common mode current $i_{CM}$ of the common mode choke 30. As such, the voltage $V_2$ across the burden resistor 60 may be used by the controller 16 to determine when ground faults occur in the motor drive system 10. For example, in the time series illustrated in FIG. 5, a ground fault has occurred near time $t_{GF}$. As illustrated, the magnitude of the time series for both the voltage $V_2$ across the burden resistor 60 and the common mode current $i_{CM}$ of the common mode choke 30 increases drastically when the ground fault occurs. As such, the controller 16 may monitor the time series for the voltage $V_2$ across the burden resistor 60 over time and detect ground faults for the motor drive system 10 based on increases in the magnitude of the voltage $V_2$ across the burden resistor 60. For example, in certain embodiments, increases of 50% (or some other threshold value, such as 100%, 150%, 200%, 250%, or even higher) in the magnitude of the voltage $V_2$ time series may indicate that a ground fault has occurred in the motor drive system 10. The particular threshold value used by the controller 16 may vary between implementations and may, in fact, be dependent upon various characteristics of both the motor drive system 10 in general, and the common mode choke 30 in particular. Yet another method for detecting a ground fault based on the time series of voltage $V_2$ across the burden resistor 60 is performing signal processing on the time series to obtain its frequency content. Specific frequencies in the spectrum of the voltage $V_2$ may be used to detect a ground fault.

Returning now to FIG. 1, the common mode choke 30 used to detect ground faults may be located at (e.g., electrically coupled to) various locations along the motor drive system 10. For example, in certain embodiments, the common mode choke 30 may be located between the AC power source 12 and the converter circuitry 20. In addition, if the power filtration circuitry 18 is used, the common mode choke 30 may be used between the AC power source 12 and the power filtration circuitry 18. In other embodiments, the common mode choke 30 may be located between the inverter circuitry 26 and the motor 14. In addition, if the output filtration circuitry 28 is used, the common mode choke 30 may be located between the output filtration circuitry 28 and the motor 14. In addition, in yet other embodiments, the common mode choke 30 may be directly coupled to the DC bus 22. These three locations are merely some of the locations where the common mode choke 30 described herein may be used. Indeed, in certain embodiments, multiple common mode chokes 30 may be used at multiple locations along the motor drive system 10.

Regardless of the location of the common mode chokes 30, each common mode choke 30 may be associated with one or more sensors for detecting signals indicative of operational characteristics of the common mode choke 30. For example, each common mode choke 30 may include a sensor for detecting signals indicative of the voltage $V_2$ across the burden resistor 60, which as described above is in series with the set of secondary turns 58. The detected signals that are indicative of the voltage $V_2$ across the burden resistor 60 may be sent to the controller 16, wherein the control circuitry 32 may monitor a time series of the voltage $V_2$ across the burden resistor 60 to determine when a ground fault has occurred for the particular common mode choke 30. Once a ground fault is detected for a particular common mode choke 30, the control circuitry 32 may determine appropriate actions for the motor drive system 10. For example, in certain embodiments, an alarm may be generated and displayed or otherwise indicated (e.g., through sound) via the operator interface 36. In addition, in certain embodiments, the control circuitry 32 may determine that the motor drive system 10 should be tripped in response to the detected ground fault.

The embodiments described herein enable low-level ground fault detection using the common mode chokes 30, which may already be required for EMC compliance. As such, the embodiments described herein leverage components of the motor drive system 10 that already exist by enabling modification of the common mode chokes 30 by simple addition of the set of secondary turns 58 and the burden resistor 60. Therefore, the addition of new hardware is minimal. As such, the embodiments described herein present a relatively inexpensive and reliable method of ground fault detection. The embodiments described herein also enable ground fault detection for motor drive systems on various types of AC power systems, such as high resistance grounding (HRG), floating AC power systems, and so forth. In addition, the embodiments described herein enable the detection of ground faults in any components of the common mode current, inasmuch as all of the components appear in the voltage $V_2$ of the burden resistor 60. For example, pulse width modulated (PWM) frequency components, low frequency components (e.g., third harmonic of fundamental frequencies), and so forth, all appear in the voltage $V_2$ of the burden resistor 60.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A motor drive system, comprising:
   converter circuitry configured to receive input three-phase alternating current (AC) power from an AC power source and convert the three-phase AC power into direct current (DC) power:
   a DC bus configured to receive the DC power from the converter circuitry;
   inverter circuitry configured to receive the DC power from the DC bus and convert it into controlled frequency output AC power for use by a three-phase motor;
   a common mode choke having a plurality of sets of primary windings and a set of secondary windings separate from the plurality of sets of primary windings, each set of primary windings directly connected to a phase of AC power, wherein the set of secondary windings are not directly connected to a phase of AC power, and wherein the set of secondary windings terminate with a burden resistor; and
   a controller configured to detect ground faults by monitoring a voltage across the burden resistor.

2. The motor drive system of claim 1, wherein the controller is configured to detect ground faults in a first mode for operational frequencies below a cut-off frequency, and the controller is configured to detect ground faults in a second mode for operational frequencies above the cut-off frequency.

3. The motor drive system of claim 2, wherein the controller is configured to detect ground faults in the first mode assuming that a referred resistance of the burden resistor is substantially greater than a self-impedance of each of the sets of primary windings.

4. The motor drive system of claim 3, wherein the controller is configured to detect ground faults in the second mode assuming that a referred resistance of the burden resistor is substantially smaller than a self-impedance of each of the sets of primary windings.

5. The motor drive system of claim 1, wherein the common mode choke is electrically coupled between the AC power source and the converter circuitry.

6. The motor drive system of claim 1, wherein the common mode choke is electrically coupled between the inverter circuitry and the motor.

7. The motor drive system of claim 1, wherein the common mode choke is directly coupled to the DC bus.

8. A method, comprising:
   monitoring signals indicative of a voltage across a burden resistor in series with a set of secondary turns wound around a core of a common mode choke of a motor drive system; and
   determining whether a ground fault has occurred in the motor drive system based on changes in the voltage across the burden resistor over time, wherein determining whether a ground fault has occurred in the motor drive system comprises determining whether a ground fault has occurred in the motor drive system in a first mode for operational frequencies below a cut-off frequency, and determining whether a ground fault has occurred in the motor drive system in a second mode for operational frequencies above the cut-off frequency.

9. The method of claim 8, wherein each set of primary turns is associated with a respective phase of alternating current (AC) power.

10. The method of claim 8, comprising determining whether a ground fault has occurred in the motor drive system in the first mode assuming that a referred resistance of the burden resistor is substantially greater than a self-impedance of each of the sets of primary turns.

11. The method of claim 8, comprising determining whether a ground fault has occurred in the motor drive system in the second mode assuming that a referred resistance of the burden resistor is substantially smaller than a self-impedance of each of the sets of primary turns.

12. The method of claim 8, comprising monitoring signals indicative of the voltage across the burden resistor in series with the set of secondary turns wound around the core of the common mode choke, which is electrically coupled between an alternating current (AC) power source and converter circuitry of the motor drive system.

13. The method of claim 8, comprising monitoring signals indicative of the voltage across the burden resistor in series with the set of secondary turns wound around the core of the common mode choke, which is electrically coupled between inverter circuitry of the motor drive system and a motor.

14. The method of claim 8, comprising monitoring signals indicative of the voltage across the burden resistor in series with the set of secondary turns wound around the core of the common mode choke, which is directly coupled to a direct current (DC) bus of the motor drive system.

15. A common mode choke system, comprising:
a plurality of sets of primary windings, wherein each set of primary windings is directly connected to a phase of alternating current (AC) power;
a set of secondary windings separate from the sets of primary windings, wherein the set of secondary windings are not directly connected to a phase of AC power, and wherein the set of secondary windings terminate with a burden resistor; and
a controller configured to detect ground faults by monitoring a voltage across the burden resistor.

16. The common mode choke system of claim 15, wherein the controller is configured to detect ground faults in a first mode for operational frequencies below a cut-off frequency, and the controller is configured to detect ground faults in a second mode for operational frequencies above the cut-off frequency.

17. The common mode choke system of claim 15, wherein each of the plurality of sets of primary windings is connected to a respective phase of AC power for a motor drive system.

\* \* \* \* \*